April 29, 1952   H. L. HOSTERMAN, JR   2,595,195
GOVERNOR FOR HELICOPTER ROTOR BLADES
Filed July 29, 1949                         2 SHEETS—SHEET 1

INVENTOR.
Harry L. Hosterman Jr.
BY
A. H. Oldham
ATTORNEY

April 29, 1952     H. L. HOSTERMAN, JR     2,595,195
GOVERNOR FOR HELICOPTER ROTOR BLADES Filed July 29, 1949     2 SHEETS—SHEET 2

INVENTOR.
Harry L. Hosterman, Jr.
BY
H H Oldham
ATTORNEY

Patented Apr. 29, 1952

2,595,195

UNITED STATES PATENT OFFICE 2,595,195

GOVERNOR FOR HELICOPTER ROTOR BLADES

Harry L. Hosterman, Jr., Atwater, Ohio, assignor to Goodyear Aircraft Corporation, Akron, Ohio, a corporation of Delaware Application July 29, 1949, Serial No. 107,446

7 Claims. (Cl. 264—9)

This invention relates to helicopter rotors and in particular to a governor for controlling the pitch of the rotor blades in order to keep the rotor always running at substantially the same speed regardless of change in power input.

Uniform rotor speed has the advantage that the blades, if hinged, will always hold the same angle relative to the rotor axis, because of the centrifugal force being constant which, of course, is also the case with blades of the rigid type. Thus, repeated variations of the stresses in the blades due to centrifugal force are practically eliminated and, accordingly, resultant fatigue of the material is avoided to the greatest extent.

Heretofore, it has been known to hold the speed of helicopter rotors constant, either by manually operated mechanical means for changing the rotor blade pitch or by electrical means. However, a hand operated device puts very great strain on the operator and requires great skill but without achieving satisfactorily the desired effect, whereas electrically operated governors, known so far, have not been sufficiently sensitive to assure the desired degree of uniform rotor speed.

It is the general object of the invention to avoid and overcome the foregoing and other difficulties of and objections to prior art practices by the provision of a governor designed to automatically control the speed of a helicopter rotor within narrow limits regardless of changes in power input to the rotor or power required by the rotor, and to also control the rotor speed in auto rotational flight.

Another object of the invention is to make a rotor blade governor highly sensitive against fluctuations of the rotor speed by an offspeed differential in combination with a rate differential sensing the speed at which the rotor speed changes occur and to readily rectify speed variations of the rotor.

Another object of the invention is to provide damping means in the governor to prevent undesired oscillations in the system.

Another object of the invention is to relieve a helicopter pilot from the difficult task of manually controlling the pitch of the rotor blades.

Another object of the invention is to reduce or eliminate in the rotor blades stress variations due to variable rotor speed and which might lead to fatigue of the material.

The aforesaid objects of the invention and other objects which will become apaprent as the description proceeds are achieved by providing a governor including an off-speed planetary differential gear, the planet gears of which are driven by an electric constant speed motor or any other suitable constant speed device, and the surrounding ring gear being driven via a transmission gear from the rotor shaft, which is to be kept at constant rotary speed. A second planetary differential gear, sensitive to the speed change rate of the rotor, provided with a fly wheel attached to its ring gear is driven from the rotor shaft via a transmission gear on the same shaft as that driving the off-speed planetary gear. Both planetary gear sets are rotatable about a control shaft and about sun gears of the planetary differentials, the sun gear of the off-speed differential being mounted on a splined portion of the control shaft which is slidable therein, and the sun gear of the rate differential being engaged with a threaded portion of the control shaft. Both sun gears, one engaging the spindle portion, and the other one the splined portion of the control shaft, remain in fixed position as long as the rotor speed continues to be in the proper ratio to the speed of the constant speed motor, that is, the control shaft then will neither rotate nor move longitudinally. However, as soon as the speed of the rotor changes the sun gear of the off-speed differential will turn the control shaft one way or the other, depending on the increase or decrease, respectively, of the rotor speed and thereby move the control shaft outwardly or inwardly by means of its thread. The outer end of the control shaft being connected to electric switches for supplying current to motors for controlling the pitch of the rotor blades to bring the rotor back to the desired speed.

At the other end of the control shaft a fly wheel attached to the ring gear is rotated by the planet gears at high speed to absorb considerable energy with the inner or sun gear being stationary as long as the rotor has the specified speed, however any change in the rotor speed, because of the fly wheel's tendency to maintain its acquired speed, will primarily act upon the sun gear either in one or the other direction, depending upon increase or decrease of the rotor speed, and thus will force the control shaft to turn, resulting in linear movement thereof which adds to that caused by the sun wheel of the off-speed differential to effect a change in the rotor blade pitch for returning the rotor to its specified speed. In rotating the sun wheel, which is geared with a rotatable viscous or magnetic damper of light weight, a torque is created in the sun gear shaft reacting upon the fly wheel, either accelerating or decelerating it, which action, of course, is reversed upon change of the blade pitch until the specified rotor speed is again re-established. The damper has also the function of smoothing out oscillatory motions in the system. Whereas the off-speed differential is responsive to the rotor speed difference from a specified rotor speed, the rate differential is sensitive to the rate at which the rotor speed changes.

For a better understanding of the invention reference should be had to the accompanying drawings, wherein.

Figure 1:
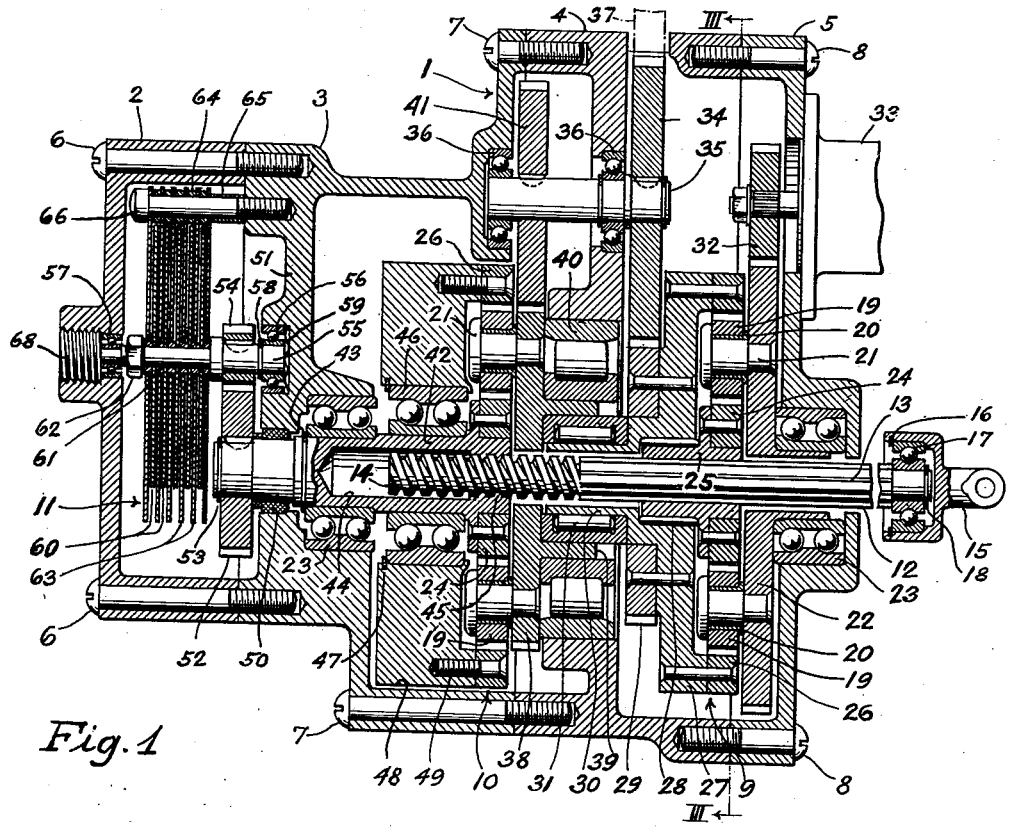
Fig. 1 is a cross-sectional longitudinal view of one embodiment of the invention.
Figure 2:
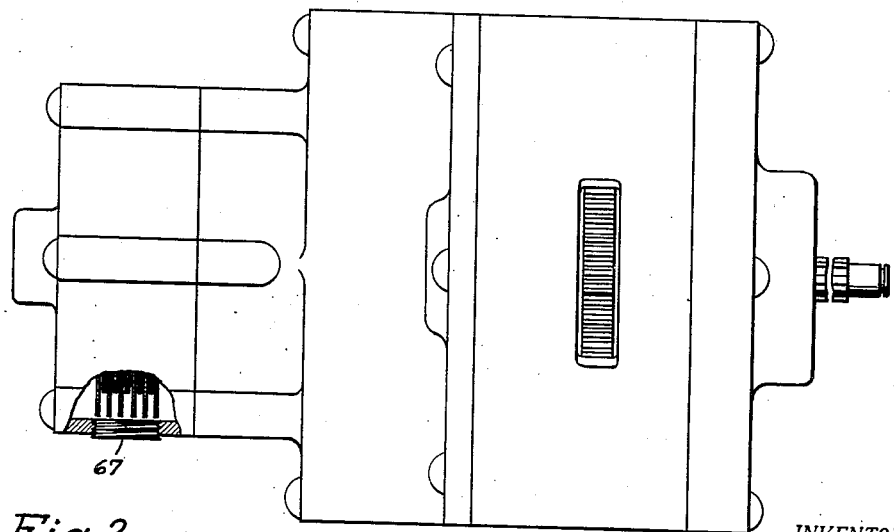
Fig. 2 is a top view, partly in section, of Fig. 1.
Figure 3:
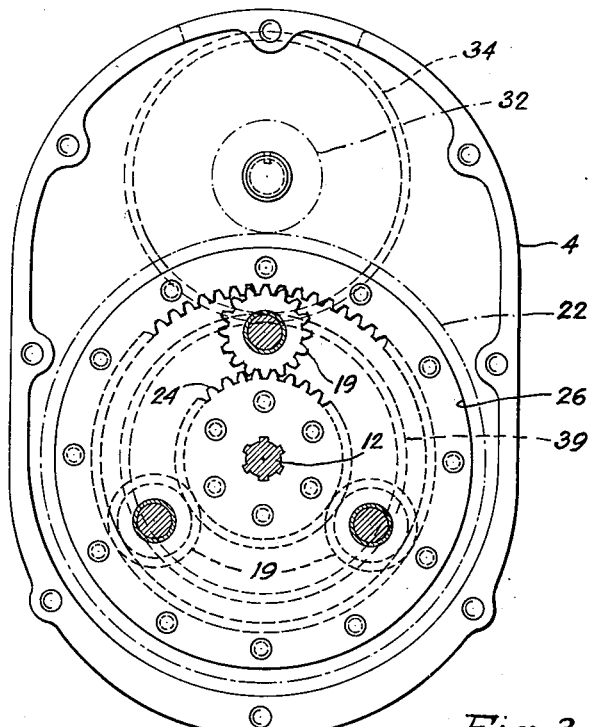
Fig. 3 is a cross-sectional view taken on line III—III of Fig. 1.
Figure 4:
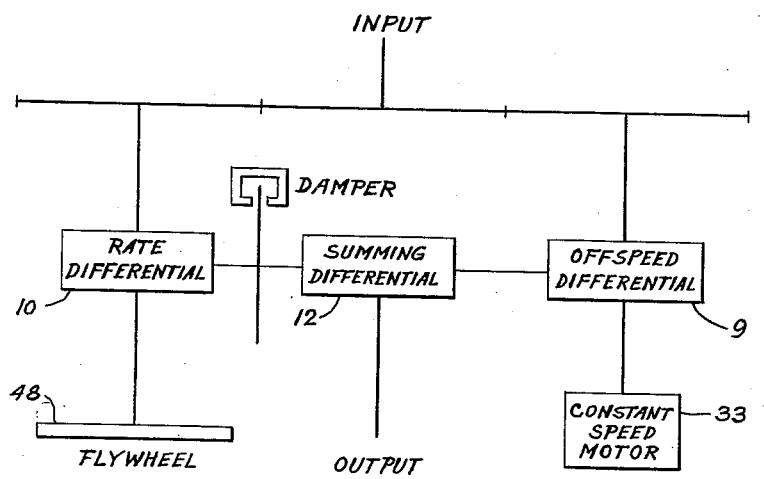
Fig. 4 is a diagrammatic sketch of the apparatus.

With specific reference to the form of the invention illustrated in the drawings, the numeral 1 indicates in general a housing of the apparatus consisting of four sections 2, 3, 4 and 5 held together by screws 6, 7 and 8 and in which are mounted a planetary off-speed differential 9, a planetary rate differential 10 coupled with a damper 11, all of which, indicated as a whole, act upon a summing differential or control shaft 12, one portion of which provided with splines 13 being acted upon by the off-speed differential 9, and the remaining portion provided with a thread 14 being acted upon by the rate differential 10, that is, the rotary differential movements caused in these differentials by changing rotor speeds will be translated into a longitudinal movement of the control shaft 12. This shaft is provided with an end fitting 15, rotatable about and secured by a snap ring 16 to a ball bearing 17 fastened by a snap ring 18 to the shaft 12. The end fitting 15 is to be attached to electrical switches (not shown) which control electric servo motors, or to a hydraulic arrangement for changing the pitch of the propeller blades when the speed of the rotor changes, in order to bring the rotor back to the desired speed, or it may be directly connected, as in the case of light control forces, to other devices.

The off-speed differential 9 comprises a plurality of circumferentially spaced planet gears 19, each of which, provided with a bushing 20, being rotatably mounted on a pin 21 fixed to a driving gear 22 supported by a ball bearing 23 seated in the housing section 5. The planet gears 19 are in mesh with the sun gear 24 secured to a splined hub 25 in which the control shaft 12 is slidable and also with a ring gear 26 secured to a gear support 27 which rides on needle bearing 28 rotatable about the hub 25. Also secured to the ring gear support 27 is a driving gear 29. From the gear support 27 extends a tube-like extension 30 which is carried by a needle bearing 31. The driving gear 22 is in mesh with a pinion 32 attached to the shaft of a constant-speed electric motor 33, or any other type motor, fastened to the housing section 5, whereas the ring gear 26 is driven by the driving gear 29 in mesh with a transmission gear 34 which is secured to a transmission shaft 35 carried by ball bearings 36 in the housing sections 3 and 4. On the other hand the transmission gear 34, running in the same direction as the pinion 32, is in mesh with a gear 37 driven by the rotor which is to maintain the same speed at any power input. With the rotor running at the desired speed and with the constant-speed motor 33 at a definite rate of speed the control shaft 12 will remain stationary.

The planetary rate differential 10 is of similar construction as the off-speed differential 9 and includes a plurality of planet gears 19, each of which, provided with a bushing 20, being rotatably mounted on a pin 21 secured to the driving gear 38 which is provided with a cylindrical extension 39 enclosing the needle bearing 31 and which also fits into the roller bearing 40 supported by the housing section 4. The driving gear 38 of the rate differential 10 is in mesh with the transmission gear 41 on the shaft 35 which is rotated by the helicopter rotor. In mesh with the planet gears 19 is a center or sun gear 24 which is fastened to a flanged shaft 42, supported by a ball bearing 23 seated in the housing section 3 and secured on the shaft 42 by a snap ring 43. A bore 44 reaching into the shaft 42 for receiving the threaded portion 14 of the control shaft 12 is provided at its outer end with a thread 45 in engagement with the threaded portion 14 of the shaft 12. To a ball bearing 46 mounted on the shaft 42 is secured by a snap ring 47 a fly wheel 48 to which is attached by screws 49 a ring gear 26 in mesh with the planet gears 19 of the rate differential 10. The free end of the shaft 42, which is oil-sealed by a ring 50 against the wall 51 through which it passes, carries a pinion 52 secured thereto by a snap ring 53. With the rotor running at specified speed the sun gear shaft 42 will not rotate and the damper 11 then will be stationary also, but operative the instant the rotor is off the specified speed.

In order to prevent undesired rotation and to regulate desired rotation of the shaft 42 and consequently linear shifting of control shaft 12 the pinion 52 is geared with pinion 54 keyed to the damper shaft 55 rotatable in ball bearings 56 and 57 inserted, respectively, in the housing sections 3 and 2. The bearing 56 secured to the shaft 43 by a snap ring 58 is backed by a corrugated disk spring 59. On the shaft 55 are mounted disks 60 between spacers 61 with a nut 62 holding them together. Another set of disks 63 alternating with the disks 60 are fixed between spacers 64 and 65 on a pin 66 against rotation and centered by the spacers 61 on the damper shaft 55. The space of the housing 1 containing the damper 11 is filled with oil so that a damping effect is established between the disks 60 and 63 when the disks 60 are rotated. A filler plug 67 is provided in the casing section 2 and a plug 68 bears against the bearing 57.

When operating the apparatus the planet gears 19 of the off-speed differential 9 are driven from the constant speed motor 33, the speed of which, however, can be varied to suit a specified rotor speed, whereas the ring gear 19 of the differential 9 is driven from the rotor running at the specified speed which is to be controlled by the apparatus. The motor pinion 32 and the transmission gear 34 run in the same direction with the gear ratios being so determined that at a definite constant speed of the motor 33 and at specified speed of the rotor the sun gear 24 will remain in fixed postion. However, as soon as the speed of the rotor changes, for instance, is increased relative to that of the constant speed motor 33 the sun gear 24 of the off-speed differential which is splined with and slidable relative to the control shaft will rotate the control shaft in the same direction as long as the off-speed is at one side of the specified rotor speed and thereby move it, because of its threaded portion, longitudinally to engage servo motors for changing the blade pitch. Simultaneously the rate differential 10 will act upon the control shaft 12 in similar manner. However, in this case, the increased speed of the planet gear set, because of the fly wheel inertia, will first act upon the stationary sun gear which thereby is turned in a direction opposite to that of the fly wheel and puts the damper geared with the sun gear into rotation, whereby the torque set up in the sun gear shaft by the brake action of the damper will react through the sun gear and planet gears against the fly wheel to be accelerated until it reaches peak speed. By turning the sun gear of the rate differential in a direction opposite to the sun gear of the off-speed differential the linear movements of the control shaft due to the turning of each sun gear are added to more rapidly engage the servo motor to increase the pitch of the rotor blades and accordingly slow down the rotor speed which in turn will cause deceleration of the fly wheel. Such deceleration will make the sun gear of the rate differential rotate in opposed direction, that is, in the same direction as the sun gear of the off-speed differential, the speed of which being slowed down also, and thus move the control shaft back until the specified rotor speed is reestablished again. The damper, which may be of any suitable type, also serves the purpose to prevent or to reduce overcontrol of the apparatus and insures its smooth operation. An apparatus of this type is very sensitive and readily responds to changes of a specified rotor speed. Of course, when the specified rotor speed decreases, the action of the sun wheels will be reversed, and in each case the resultant linear movement of the control shaft is the algebraic sum of the linear movements resulting from both differentials.

It will be recognized that the objects of the invention have been achieved by rectifying the deviation from a desired helicopter rotor speed by a governor which controls this rotor speed within narrow limits and instantaneously owing to the fact that the speed of the rotor is not controlled only by an off-speed differential, but also by a rate differential sensitive to the speed at which the rotor speed changes and thus makes the governor a valuable instrument, which because of its instantaneous action is especially adapted for controlling the pitch of rotor blades which are subject to high acceleration. The governor is entirely automatic and relieves the pilot from a tedious and troublesome job of continuous correction of rotor speed changes. The apparatus keeps, by keeping the rotor speed substantially uniform, the centrifugal forces acting on the propeller blades also uniform and avoids critical changes leading to fatigue of the structural material.

While certain representative embodiments and details have been shown for the purpose of illustrating the invention, it will be apparent to those skilled in the art that various changes and modifications may be made therein without departing from the spirit or scope of the invention.

What I claim:

1. In combination in a governor adapted to change the pitch of the blades of a helicopter rotor, or the like, to be rotated at a specified speed at any power input, a housing, an off-speed planetary differential, a speed change rate planetary differential, both differentials being rotatably mounted in said housing, each differential comprising a sun gear, a ring gear and a set of planet gears, a summing differential for translating the rotary motion of the sun gears into linear motion by adding the output of the planetary differentials including a control shaft about which said planetary differentials rotate and co-act therewith, said shaft having a threaded portion and a splined portion, a rotatably mounted output head at one end of said shaft, a constant-speed transmission for rotating the planet gears of the off-speed differential, a rotor driven transmission for rotating in the same direction the sun gear of the off-speed differential and also rotating the planet gear set of the rate differential, a fly wheel attached to the ring gear of the rate differential, a rotatably supported splined hub attached to the sun gear of the off-speed differential in which said control shaft is longitudinally slidable, a rotatably supported hub shaft secured to the sun gear of the rate differential and provided with a threaded socket for engaging the threaded portion of said shaft, and a rotatable damper geared with said hub shaft for normally arresting said sun gears and to control acceleration and deceleration, respectively, of said fly wheel when said sun gears rotate at a speed change above and below a specified speed.

2. In combination in a governor adapted to change the pitch of the blades of a helicopter rotor, or the like, to be rotated at a specified speed at any power input, a housing, an off-speed planetary differential, a speed change rate planetary differential, both differentials being rotatably mounted in said housing, each differential comprising a sun gear, a ring gear and a set of planet gears, a summing differential for translating the rotary motion of the sun gears into linear motion by adding the output of the planetary differentials including a control shaft about which said planetary differentials rotate and co-act therewith, said shaft having a threaded portion and a splined portion, a rotatably mounted output head at one end of said shaft, a constant-speed transmission for rotating the plane gears of the off-speed differential, a rotor driven transmission for rotating in the same direction the sun gear of the off-speed differential and also rotating the planet gear set of the rate differential, a fly wheel attached to the ring gear of the rate differential, a rotatably supported splined hub attached to the sun gear of the off-speed differential in which said control shaft is longitudinally slidable, and a rotatably supported hub shaft secured to the sun gear of the rate differential and being provided with a threaded socket for engaging the threaded portion of said shaft.

3. In combination in a governor of a power input, a differential having two inputs and one output and having one input connected to the power input, an adjustable constant speed motor connected to the other input of the differential, a second differential having two inputs and one output and having one input connected to the power input, a flywheel connected to the other input of the second differential, a summing differential having two inputs and one output and having one input connected to the output of the first differential and its other input connected to the output of the second differential, and rotatable means at the output of the summing differential.

4. In combination in a governor of a power input, a differential having two inputs and one output and having one input connected to the power input, an adjustable constant speed motor connected to the other input of the differential, a second differential having two inputs and one output and having one input connected to the power input, a flywheel connected to the other input of the second differential, and a summing differential having two inputs and one output and having one input connected to the output of the first differential and its other input connected to the output of the second differential.

5. In combination in a governor of a power input, a differential having two inputs and one output and having an input connected to the power input, constant speed means connected to the other input of the differential, a second differential having two inputs and an output and having one input connected to the power input, a flywheel connected to the other input of the second differential, a summing differential having two inputs and one output and having one input connected to the output of the first differential and the other input connected to the output of the second differential, and a head rotatably attached to the output end of the summing differential.

6. In combination in a governor of a power input, a differential having two inputs and one output and having an input connected to the power input, constant speed means connected to the other input of the differential, a second differential having two inputs and an output and having one input connected to the power input, a flywheel connected to the other input of the second differential, a summing differential having two inputs and one output and having one input connected to the output of the first differential and the other input connected to the output of the second differential, a damper on the output of the second differential, and a head rotatably attached to the output end of the summing differential.

7. In combination in a governor mounted in a casing of a power input, an off-speed planetary differential having two inputs and one output and having an input connected to the power input, an adjustable constant speed motor connected to the other input of the differential, a rate-change planetary differential having one input connected to the power input, a flywheel connected to the other input of the rate-change differential, a summing differential consisting of a slidable, rotatable shaft extending from said casing and having a splined portion and a threaded portion, the output of one of said planetary differentials acting upon the splined portion and the other planetary differential acting upon the threaded portion of said shaft to impart thereupon a longitudinal movement when relative output speed changes occur between both planetary differentials, and a head rotatably attached to the shaft end extending from said casing.

HARRY L. HOSTERMAN, Jr.

REFERENCES CITED

The following references are of record in the file of this patent:

UNITED STATES PATENTS

| Number | Name | Date |
|---|---|---|
| 1,368,755 | Roddey | Feb. 15, 1921 |
| 2,252,545 | Benz | Aug. 12, 1941 |
| 2,375,429 | Martin | May 8, 1945 |
| 2,399,685 | McCoy | May 7, 1946 |
| 2,441,605 | Trofimov | May 18, 1948 |
| 2,478,279 | Kochenburger | Aug. 9, 1949 |